(12) United States Patent
Asanuma (10) Patent No.: US 12,012,132 B2
(45) Date of Patent: Jun. 18, 2024

(54) DATA TRANSMITTING DEVICE, AND DATA TRANSMITTING METHOD

(71) Applicant: PANASONIC INTELLECTUAL PROPERTY MANAGEMENT CO., LTD., Osaka (JP)

(72) Inventor: Tsutomu Asanuma, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 630 days.

(21) Appl. No.: 17/268,236

(22) PCT Filed: May 31, 2019

(86) PCT No.: PCT/JP2019/021873
§ 371 (c)(1),
(2) Date: Feb. 12, 2021

(87) PCT Pub. No.: WO2020/035985
PCT Pub. Date: Feb. 20, 2020

(65) Prior Publication Data
US 2021/0316770 A1 Oct. 14, 2021

(30) Foreign Application Priority Data

Aug. 14, 2018 (JP) .................................. 2018-152667

(51) Int. Cl.
*B61L 15/00* (2006.01)
*H04B 7/06* (2006.01)

(52) U.S. Cl.
CPC ....... *B61L 15/0018* (2013.01); *B61L 15/0072* (2013.01); *H04B 7/0617* (2013.01)

(58) Field of Classification Search
CPC . B61L 15/0018; B61L 25/023; G08G 1/0145; G08G 1/0969; H04B 7/18504;
(Continued)

(56) References Cited

U.S. PATENT DOCUMENTS 4,914,441 A * 4/1990 Brookner ............ G01S 13/5242
342/161
2004/0095916 A1 5/2004 Maki et al.
(Continued)

FOREIGN PATENT DOCUMENTS

CN 103095356 5/2013
CN 107079237 8/2017
(Continued)

OTHER PUBLICATIONS

Extended European Search Report from European Patent Office (EPO) in European Patent Appl. No. 19849365.2, dated Sep. 7, 2021.
(Continued)

*Primary Examiner* — Yuri Kan
(74) *Attorney, Agent, or Firm* — Greenblum & Bernstein, P.L.C.

(57) ABSTRACT

A data transmitting device includes: a transmitter; a processor; and a memory comprising instructions that, when executed by the processor, cause the processor to perform operations. The operations include: performing beam forming processing with a terminal provided in at least one moving object; detecting a beam angle based on a result of the beam forming processing; estimating a position of the at least one moving object based on the beam angle and installation position information of the data transmitting device; determining whether the estimated position of the at least one moving object is within a communication area of the data transmitting device; and transmitting desired data to the at least one moving object through the transmitter if it is determined to be within the communication area.

7 Claims, 5 Drawing Sheets

(58) Field of Classification Search
CPC ..... H04B 10/564; B60Q 1/0076; G01S 17/42; G01S 13/5242
See application file for complete search history.

(56) References Cited

U.S. PATENT DOCUMENTS

| | | | |
|---|---|---|---|
| 2014/0204000 A1 | 7/2014 | Sato | |
| 2015/0241562 A1* | 8/2015 | Goldberg | G01S 17/42 356/5.01 |
| 2016/0001803 A1* | 1/2016 | Kim | B61L 25/023 246/124 |
| 2016/0080279 A1 | 3/2016 | Tan et al. | |
| 2016/0094290 A1* | 3/2016 | Nishino | H04B 10/564 398/26 |
| 2017/0368984 A1* | 12/2017 | Salter | B60Q 1/0076 |
| 2018/0019516 A1* | 1/2018 | Teague | H04B 7/18504 |
| 2018/0053413 A1* | 2/2018 | Patil | G08G 1/0969 |
| 2018/0144623 A1* | 5/2018 | Shirakata | G08G 1/0145 |
| 2019/0236648 A1 | 8/2019 | Yokoyama et al. | |
| 2021/0073859 A1 | 3/2021 | Yokoyama et al. | |

FOREIGN PATENT DOCUMENTS

| | | |
|---|---|---|
| CN | 107635189 | 1/2018 |
| JP | 11-146464 | 5/1999 |
| JP | 2014-142255 | 8/2014 |
| WO | 2018/100684 | 6/2018 |

OTHER PUBLICATIONS

Laiyemo et al., "Higher Frequency Band Beamforming Scheme for High Speed Train", 2017 IEEE Vehicular Networking Conference (VNC), IEEE, Nov. 27, 2017 (Nov. 27, 2017), pp. 203-208.

Liu et al., "Location-Fair Beamforming for High Speed Railway Communication Systems", IEEE Access, vol. 6, 2018, pp. 28632-28642.

International Search Report (ISR) from International Searching Authority (Japan Patent Office) in International Pat. Appl. No. PCT/JP2019/021873, dated Aug. 20, 2019, together with an English language translation.

Written Opinion (WO) from International Searching Authority (Japan Patent Office) in International Pat. Appl. No. PCT/JP2019/021873, dated Aug. 20, 2019, together with an English language translation.

"The existing system using 60GHz millimeter-wave, Information and Communication Council, Information and Communication Technology Subcommittee, Land Radio Communications Committee, 60GHz wireless equipment working group", Mitsubishi Electric Corporation, http://www.soumu.go.jp/main_content/000331036.pdf, Dec. 2014, pp. 35-39.

Katto, "An ICN use case in proactive video caching using Transportation Systems", Proceedings of the Society Conference of IEICE 2015 communication (2), Aug. 2015, section 2.

Laiyemo et al., "Higher Frequency Band Beamforming Scheme for High Speed Train," 2017 IEEE Vehicular Networking Conference (VNC), Nov. 29, 2017, p. 1-6.

* cited by examiner

DATA TRANSMITTING DEVICE, AND DATA TRANSMITTING METHOD

TECHNICAL FIELD

The present invention relates to a data transmitting device and a data transmitting method for transmitting content data such as an advertisement video to a railroad car, for example.

BACKGROUND ART

In the related art, updating of content data such as an advertisement video distributed in a railroad car is usually performed by replacing a storage medium such as a hard disk outside the operation time in a garage or by wireless communication using WiFi (registered trademark) or the like while the railroad car is stopped.

Although WiFi (registered trademark) is excellent in covering a wide area, it is difficult to perform stable communication using WiFi (registered trademark) due to radio frequency interference with a railroad car stopped at an adjacent station platform caused by radio waves or due to radio frequency interference with a plurality of cars caused by over-reach. Further, in a case where the railroad car performs communication while running, it is necessary to cause directivity of an antenna to cover a wide area, but in a case of a general omnidirectional antenna (nondirectional antenna), the railroad car is susceptible to radio frequency interference from the surroundings.

For example, Non-Patent Literature 1 discloses a system, in which millimeter waves at a 60 GHz band are used, as a system that makes it difficult to receive radio frequency interference with a railroad car stopped at an adjacent station platform or radio frequency interference with a plurality of cars. The system includes a ground device and an on-board device. The ground device is installed at a location such as a terminal station or a reversing station where stop time of a railroad car is long, or a specific location such as a departure track from a garage to an operating track. The on-board device is installed in a control platform on the railroad car. By using millimeter waves for communication between the ground device and the on-board device, the ground device and the on-board device can perform stable communication with each other without receiving over-reach interference.

CITATION LIST

Non-Patent Literature

Non-Patent Literature 1: "The Existing System Using 60 GHz Millimeter-Wave", December 2014, Mitsubishi Electric Corporation, pp. 35-39, Internet <URL: http://www.soumu.go.jp/main_content/000331036.pdf>

SUMMARY OF INVENTION

Technical Problem

However, since the system disclosed in Non-Patent Literature 1 transmits content data to the railroad car while the railroad car is stopped at the platform, it is ineligible for transmitting information in real time and the amount of data that can be transmitted is limited. Here, examples of content data to be transmitted in real time include information of emergency such as a disaster warning, and breaking news.

An object of the present invention to provide a data transmitting device and a data transmitting method capable of performing stable communication without radio frequency interference with other moving objects, transmitting information in real time and increasing the amount of data that can be transmitted.

Solution to Problem

A data transmitting device of the present invention includes: a beam forming processing unit configured to perform beam forming processing with a terminal provided in a moving object; a beam angle detection unit configured to detect a beam angle based on a result of the beam forming processing; and a moving object position estimation unit configured to estimate a position of the moving object based on the beam angle and installation position information of the data transmitting device, in which the data transmitting device determines whether the estimated position of the moving object is within a communication area of the data transmitting device, and the data transmitting device transmits desired data to the moving object if it is determined to be within the communication area.

According to the above configuration, even when the at least one moving object is moving, the position of the at least one moving body can be specified, and the data can be transmitted to the at least one moving body in a spot manner, so that stable communication can be performed without radio frequency interference. Further, since data can be transmitted even when the at least one moving object is moving, a transmission period of the data can be made longer than in the related art, the data can be transmitted in real time accordingly, and the amount of data that can be transmitted can be increased.

As an aspect of the data transmitting device of the present invention, for example, the installation position information of the data transmitting device is stored in advance.

According to the above configuration, since the installation position information of the data transmitting device is provided and the beam angle from the data transmitting device with respect to the at least one moving object can be detected, a distance between the data transmitting device and the at least one moving object can be calculated using the trigonometric function, and the position of the at least one moving object can be estimated based on a result of the calculation.

As an aspect of the data transmitting device of the present invention, for example, the data transmitting device fragments the desired data pursuant to an allowable transmission unit and transmits the fragmented data.

According to the above configuration, by dividing the data, it is possible to transmit an amount of data corresponding to a movement amount of the at least one moving object.

As an aspect of the data transmitting device of the present invention, for example, the moving object is a plurality of moving objects forming a prescribed group. With respect to one of the plurality of moving objects forming the group, the data transmitting device determines whether it is possible to complete transmission of the data while the one of the plurality of moving objects is staying in the communication area based on the estimated position of the moving object and a size of the data. The data transmitting device fragments the data if it is determined that it is not possible to complete the transmission of the data while the one of the plurality of moving objects is staying in the communication area, and the data transmitting device transmits different fragments of the data to the one of the plurality of moving objects and other moving objects forming the group, respectively, while the respective moving objects are staying in the communication area.

According to the above configuration, when there is a low possibility to complete data transmission while one moving object is staying in the communication area, data can be fragmented and transmitted to a plurality of moving objects belonging to the same group as the one moving object.

As an aspect of the data transmitting device of the present invention, for example, the data transmitting device transmits the data to the one of the plurality of moving objects without fragmenting the data if it is determined that it is possible to complete the transmission of the data while the one of the plurality of moving objects is staying in the communication area.

According to the above configuration, when it is possible to transmit data to one moving object, fragmentation is not performed. Therefore, it is possible to reduce the burden on management of communication with other moving objects belonging to the same group.

As an aspect of the data transmitting device of the present invention, for example, the moving object is a railroad car, and the group is a set of the railroad cars connected to each other.

According to the above configuration, for example, in a case where a plurality of railroad cars are connected, data can be transmitted in order from a lead car from when the lead car enters a station platform to when a last car leaves the station platform. Therefore, a transmission period of the data can be made longer than that in the related art in which data can be transmitted only when the railroad cars are stopped at the station platform.

As an aspect of the data transmitting device of the present invention, for example, the data transmitting device transmits the data using millimeter waves.

According to the above configuration, it is possible to transmit a large amount of data at high speed by transmitting the data using millimeter waves. Further, radio frequency interference from the surroundings can be suppressed to a low level.

A data transmitting method of the present invention includes: performing beam forming processing with a terminal provided in a moving object; detecting a beam angle based on a result of the beam forming processing; estimating a position of the moving body based on the beam angle and installation position information of a device that executes the data transmitting method; determining whether the estimated position of the moving object is within a communication area of the device that executes the data transmitting method; and transmitting desired data to the moving object if it is determined to be within the communication area.

According to the above method, even when the at least one moving object is moving, the position of the at least one moving body can be specified, and the data can be transmitted to the at least one moving body in a spot manner, so that stable communication can be performed without radio frequency interference. Further, since data can be transmitted even when the at least one moving object is moving, a transmission period of the data can be made longer than in the related art, the data can be transmitted in real time accordingly, and the amount of data that can be transmitted can be increased.

Advantageous Effects of Invention

The data transmitting device and the data transmitting method of the present invention are capable of performing stable communication without radio frequency interference with other moving objects, transmitting information in real time and increasing the amount of data that can be transmitted.

DESCRIPTION OF EMBODIMENTS

Hereinafter, preferred embodiments for implementing the present invention will be described in detail with reference to the drawings.

Figure 1:
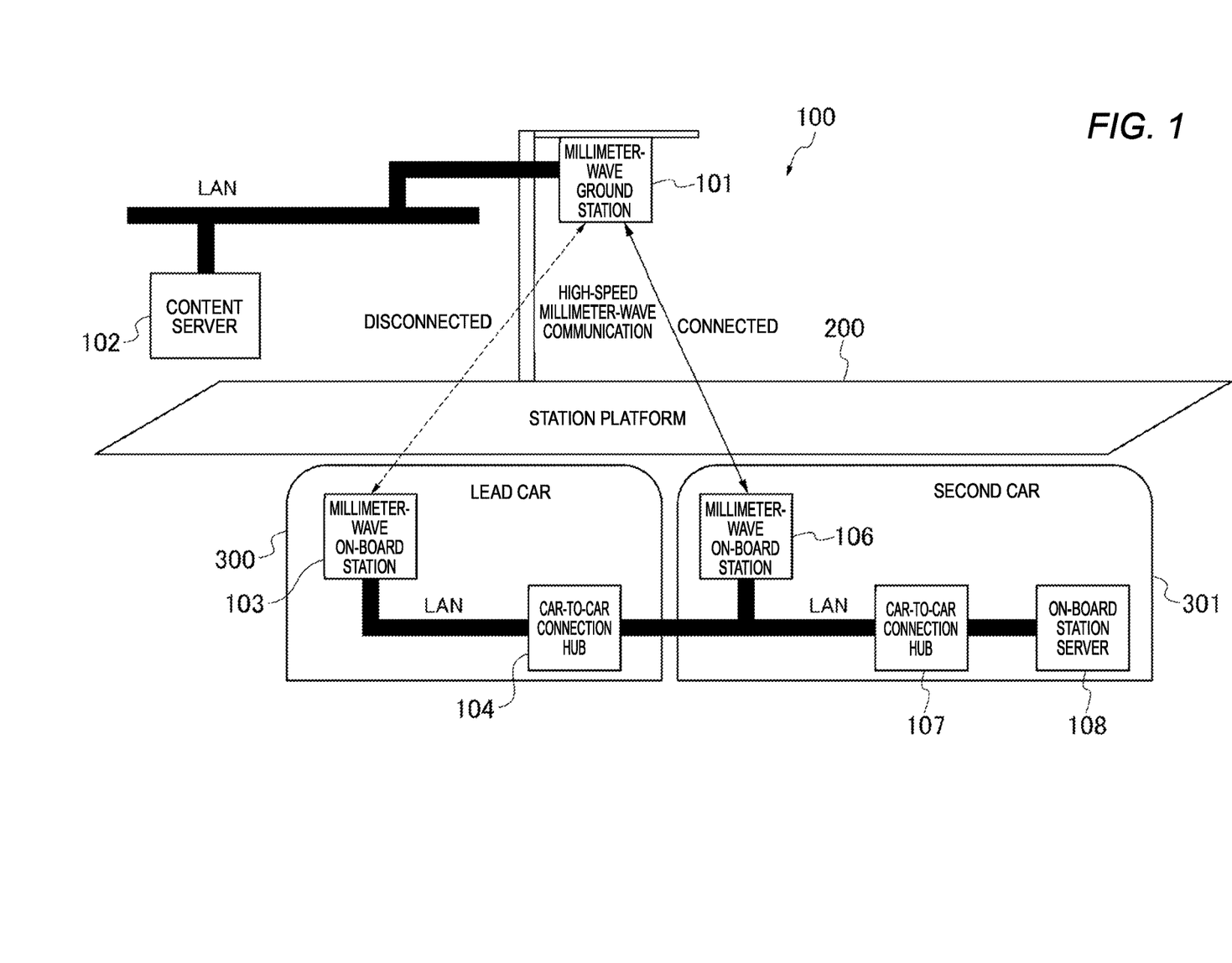
FIG. 1 is a block diagram illustrating a schematic configuration of a content data transmitting system according to an embodiment of the present invention.

FIG. 1 is a block diagram illustrating a schematic configuration of a content data transmitting system 100 according to an embodiment of the present invention. As shown in FIG. 1, the content data transmitting system 100 according to the present embodiment includes: a millimeter-wave ground station (data transmitting device) 101 that is installed at a specific location of a station platform 200; a content server 102 that is connected to the millimeter-wave ground station 101 by LAN and stores a plurality of contents; a millimeter-wave on-board station (terminal) 103 that is installed in a railroad car 300 and communicates with the millimeter-wave ground station 101; a car-to-car connection HUB 104 that is installed in the railroad 300 and is connected to the millimeter-wave on-board station 103 by LAN; a millimeter-wave on-board station (terminal) 106 that is installed in a railroad car 301 and communicates with the millimeter-wave ground station 101; a car-to-car connection HUB 107 that is installed in the railroad car 301 and is connected to the millimeter-wave on-board station 106 by LAN; and an on-board station server 108 that is installed in the railroad car 301 and is connected to the car-to-car connection HUB 107 by LAN.

The present embodiment describes a two-car train including the railroad car 300 as a lead car and the railroad car 301 as a second car. Each railroad car serves as an example of a moving object. Hereinafter, the railroad car 300 and the railroad car 301 may be simply referred to as a "car." The number of the cars is not limited. All the cars have a configuration similar to that of the lead car 300, except that the on-board station server 108 is mounted on the last car. For example, in a case of a five-car train, the on-board station server 108 is brought to the last fifth car, and the on-board station server 108 is used by LAN connection. The on-board station server 108 does not necessarily need to be installed in the last car as long as it can communicate with other cars. However, with respect to typical railroad cars, since the lead car/the last car in which driver's seats are provided is different in configuration from middle cars in which passengers seats are provided, a degree of freedom of formation of the train is increased by installing the on-board station server 108 in the lead car or the last car.

Since both the millimeter-wave ground station 101 and the content server 102 are fixedly installed, a wired LAN connection therebetween is desirable. LAN connection in each of the car 300 and the car 301, and LAN connection between the car 300 and the car 301 may be in a wired manner or a wireless manner. However, since the car 300 and the car 301 are to be connected or disconnected, a wireless manner is desirable in terms of workability.

Wireless communication using millimeter waves is used for communication between the millimeter-wave ground station 101 and the millimeter-wave on-board station 103 and communication between the millimeter-wave ground station 101 and the millimeter-wave on-board station 106. As a specific example of wireless communication using millimeter waves, high-speed millimeter-wave communication complying with the WiGig (registered trademark) standard is considered. By performing wireless communication using millimeter waves, it is possible to transmit a large amount of content data at high speed. FIG. 1 illustrates a state where communication between the millimeter-wave ground station 101 and the millimeter-wave on-board station 103 of the lead car 300 is being disconnected, and communication between the millimeter-wave ground station 101 and the millimeter-wave on-board station 106 of the second car 301 is being performed.

The millimeter-wave ground station 101 performs terminal connection processing when there is a connection request from the millimeter-wave on-board station 106, for example, in communication with the millimeter-wave on-board station 106. Further, when connection is possible, beam forming processing is performed between the millimeter-wave ground station 101 and the millimeter-wave on-board station 106, and an appropriate beam angle is detected based on a result thereof. Further, a distance from the data transmitting device (that is, the millimeter-wave ground station 101) to the second car 301 is calculated with the trigonometric function by using installation position information stored in advance by the data transmitting device, and a position of the second car 301 is estimated based on the calculated distance from the data transmitting device to the second car 301. Further, desired content data is transmitted to the second car 301 of which the position is estimated. The beam forming processing, beam angle detection processing, and car position estimation processing are performed in a similar manner between the millimeter-wave ground station 101 and the millimeter-wave on-board station 103 mounted on the lead car 300.

Figure 2:
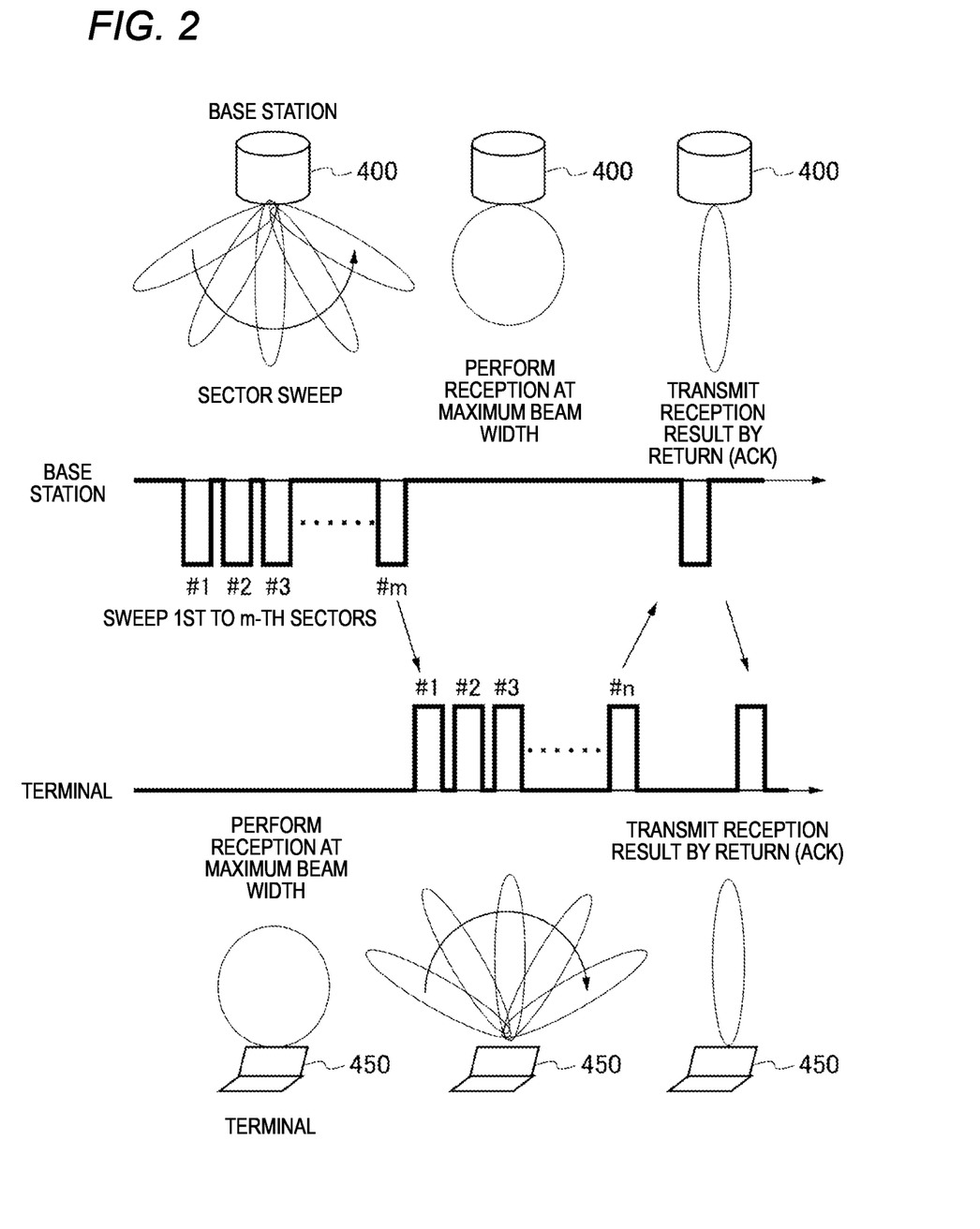
FIG. 2 is a diagram for illustrating beam forming processing used in the content data transmitting system shown in FIG. 1.

Here, the beam forming processing will be described. FIG. 2 is a diagram for illustrating the beam forming processing. FIG. 2 illustrates an example in which the beam forming processing is performed in both a base station 400 and a terminal 450. The base station 400 corresponds to the millimeter-wave ground station 101, and the terminal 450 corresponds to the millimeter-wave on-board stations 103 and 106. In the content data transmitting system 100 according to the present embodiment, the beam forming processing is mainly performed by the millimeter-wave ground station 101, and thus the base station 400 side will be described here. The base station 400 first sweeps a 1st sector to an m-th sector. A period of sweeping the 1st sector to the m-th sector is, for example, several msec. For sector sweep of the base station 400, the terminal 450 receives a maximum beam width (directivity of 360°). Further, the terminal 450 selects a sector having the largest signal strength from the received 1st sector to the m-th sector, and transmits a result thereof to the base station 400 (that is, transmits a reception result by return). For example, if signal strength of a 2nd sector is the largest, the terminal 450 returns a reception result indicating that the signal strength of the 2nd sector is the largest. Time from the sweep of the base station 400 side to the transmission of the reception result from the terminal 450 side is, for example, 100 msec.

Figure 3:
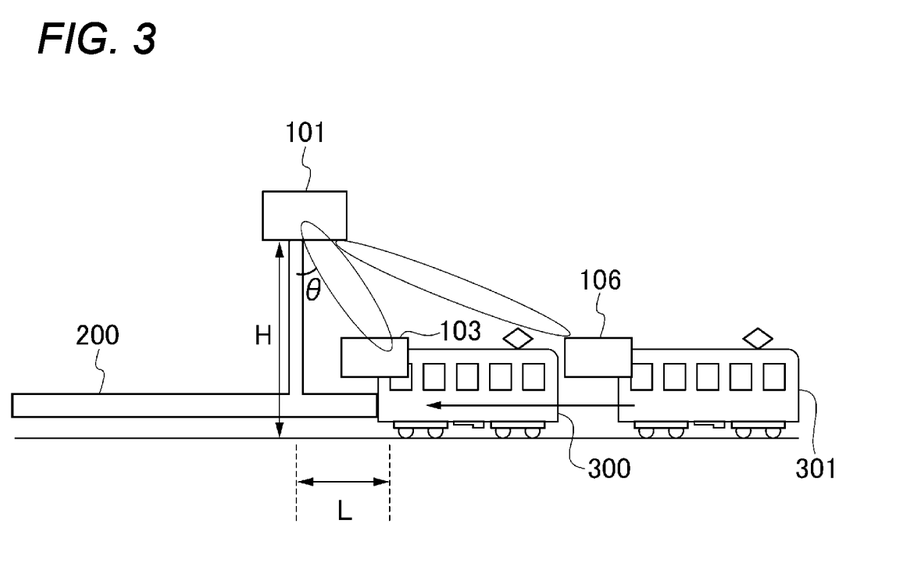
FIG. 3 is a diagram for illustrating position estimation processing of a railroad car performed by the content data transmitting system shown in FIG. 1.

Next, the car position estimation processing will be described. FIG. 3 is a diagram for illustrating the position estimation processing of the lead car 300. In FIG. 3, a height of the millimeter-wave ground station 101 is taken as "H", a beam angle with respect to the lead car 300 from the millimeter-wave ground station 101 is taken as "θ", and a distance from the millimeter-wave ground station 101 to the lead car 300 is set as "L". Since the height H of the millimeter-wave ground station 101 is obtained by being measured in advance, and the beam angle θ with respect to the lead car 300 is obtained in the beam forming processing and the beam angle detection processing, the distance L from the millimeter-wave ground station 101 to the lead car 300 can be calculated based on the trigonometric function. It is needless to say that the position of the second car 301 can also be estimated by performing the same processing.

The millimeter-wave ground station 101 estimates the position of the lead car 300, and then transmits the desired content data to the lead car 300 in a spot manner. When receiving the content data transmitted from the millimeter-wave ground station 101, the millimeter-wave on-board station 103 mounted on the lead car 300 transfers the received content data to the on-board station server 108 mounted on the second car 301 connected to the LAN.

The millimeter-wave ground station 101 fragments the content data pursuant to an allowable transmission unit prior to transmitting the content data. Since continuity of the fragments of the content data is guaranteed using sequence numbers thereof, it is possible to transmit the content data to the lead car 300 and the second car 301 integrally. That is, after transmission of a part of the content data that can be transmitted to the millimeter-wave on-board station 103 of the lead car 300, the remainder can be transmitted to the millimeter-wave on-board station 106 of the second car 301. After transmission of the part of the content data that can be transmitted to the millimeter-wave on-board station 103, the millimeter-wave ground station 101 disconnects communication with the millimeter-wave on-board station 103, and then starts communication with the millimeter-wave on-board station 106 mounted on the second car 301, and transmits remaining content data thereto. Upon receiving the content data transmitted from the millimeter-wave ground station 101, the millimeter-wave on-board station 106 mounted on the second car 301 transfers the received content data to the LAN connected on-board station server 108.

By performing the position estimation of the lead car 300 and the second car 301 and fragmenting the content data, the millimeter-wave ground station 101 can transmit the content data from the time when the lead car 300 enters the station platform 200 until the second car 301 leaves the station platform 200. Accordingly, a period during which the content data can be transmitted can be made longer as compared with that in the related art in which the content data can be transmitted only when the cars are stopped at the station platform 200. This makes it possible to transmit information in real time, and to increase the amount of data that can be transmitted.

When all of the fragmented content data is acquired, the on-board station server 108 reconstructs the fragmented content data into original content data.

Figure 4:
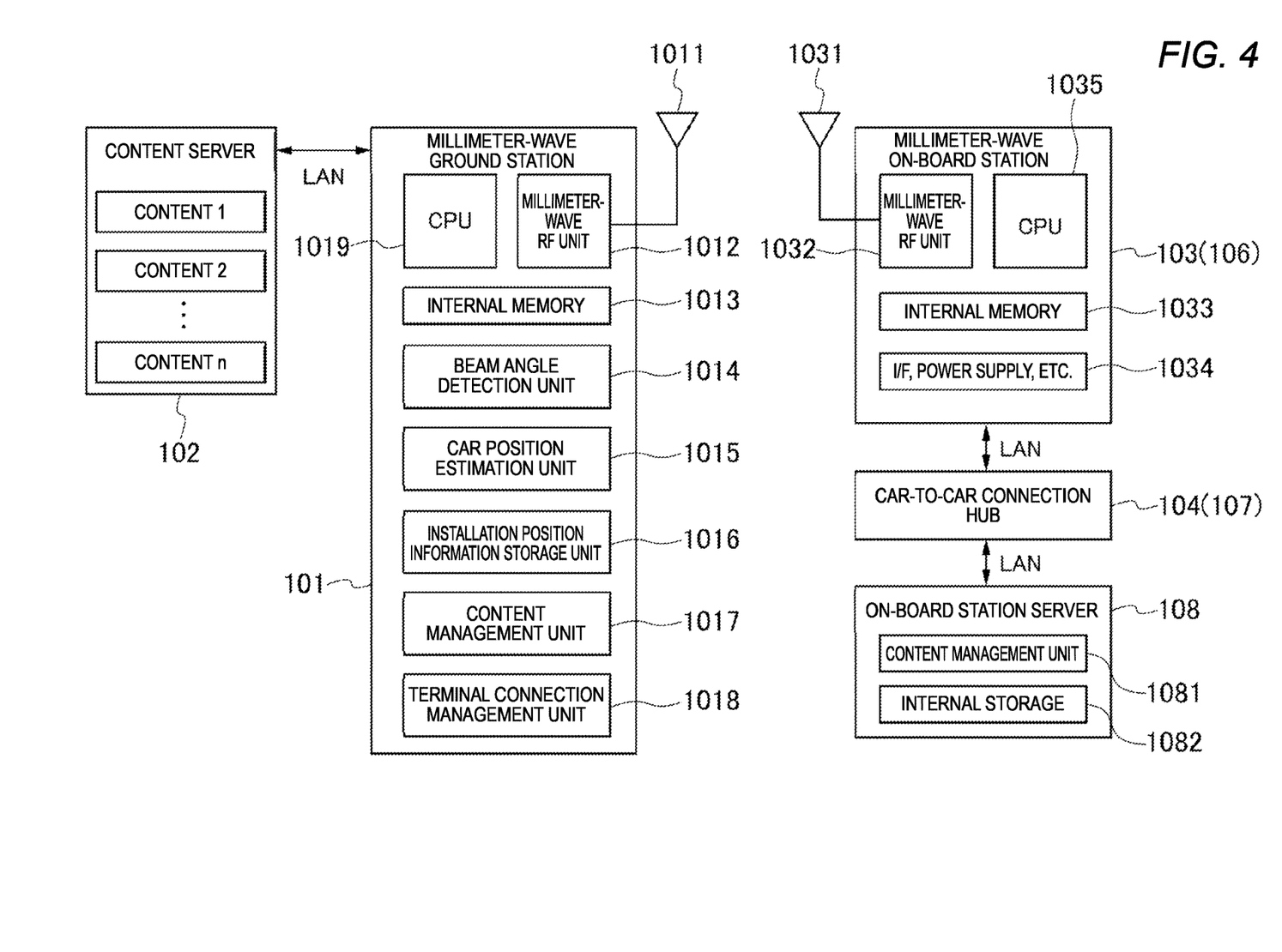
FIG. 4 is a block diagram illustrating schematic configurations of a millimeter-wave ground station, a content server, a millimeter-wave on-board station, and an on-board station server that constitute the content data transmitting system shown in FIG. 1.

FIG. 4 is a block diagram illustrating schematic configurations of the millimeter-wave ground station 101, the content server 102, the millimeter-wave on-board station 103 (106), and the on-board station server 108 that constitute the content data transmitting system 100 according to the present embodiment. As shown in FIG. 2, the millimeter-wave ground station 101 includes an antenna 1011, a millimeter-wave RF unit 1012, an internal memory 1013, a beam angle detection unit 1014, a car position estimation unit 1015, an installation position information storage unit 1016, a content management unit 1017, a terminal connection management unit 1018, and a central processing unit (CPU) 1019. The millimeter-wave RF unit 1012, the internal memory 1013, and the CPU 1019 constitute a beam forming processing unit.

The millimeter-wave RF unit 1012 modulates a baseband signal into millimeter waves at a 60 GHz band and transmits the millimeter waves. The millimeter-wave RF unit 1012 is also capable of receiving millimeter waves at the 60 GHz band, and demodulating the millimeter waves into a baseband signal and outputs the baseband signal. The internal memory 1013 includes a read only memory (ROM) in which a program for controlling the CPU 1019 is stored, and a random access memory (RAM) used in an operation of the CPU 1019. The ROM stores programs necessary for functions of the millimeter-wave ground station 101, such as a program for transmitting the content data to the lead car 300 and the second car 301, and a program for the beam forming processing.

The beam angle detection unit 1014 detects an appropriate beam angle based on a result of the beam forming processing. The car position estimation unit 1015 estimates the position of the lead car 300 and the position of the second car 301 with the trigonometric function by using the beam angle detected by the beam angle detection unit 1014 and the installation position information of the data transmitting device (that is, the millimeter-wave ground station 101). The installation position information storage unit 1016 stores the installation position information of the data transmitting device (that is, the millimeter-wave ground station 101). The content management unit 1017 performs processing of selecting the content data to be transmitted to the cars 300 and 301 and fragmenting the selected content data. The terminal connection management unit 1018 manages connection between the millimeter-wave on-board station 103 of the car 300 and the millimeter-wave on-board station 106 of the car 301. The CPU 1019 controls each unit of the device in accordance with various programs stored in the internal memory 1013.

The content server 102 stores n contents of content 1 to content n. The CPU 1019 of the millimeter-wave ground station 101 downloads desired content data from the content server 102 via the LAN.

The millimeter-wave on-board station 103 (106) includes an antenna 1031, a millimeter-wave RF unit 1032, an internal memory 1033, an IN, a power supply, and the like 1034 and a CPU 1035. The millimeter-wave RF unit 1032 modulates a baseband signal into millimeter waves at a 60 GHz band and transmits the millimeter waves. The millimeter-wave RF unit 1032 is also capable of receiving millimeter waves at the 60 GHz band, and demodulating the millimeter waves into a baseband signal and outputs the baseband signal. The internal memory 1033 includes a read only memory (ROM) in which a program for controlling the CPU 1035 is stored, and a random access memory (RAM) used in an operation of the CPU 1035. The ROM stores programs necessary for functions of the millimeter-wave on-board station 103 (106), such as a program for transmitting the content data to the lead car 300 (second car 301), a program for transmitting a reception result in the beam forming processing of the millimeter-wave ground station 101 by return, and a program for transferring the received content data to the on-board station server 108 via the LAN. The IN, a power supply, and the like 1034 includes a LAN interface, a power supply, and the like, and supplies power for LAN connection and each unit of the device.

The car-to-car connection HUB 104 (107) establishes LAN connection between the lead car 300 and the second car 301. The on-board station server 108 includes a content management unit 1081 and an internal storage 1082. The content management unit 1081 reconstructs the fragmented content data from the millimeter-wave ground station 101 into the original content data. The internal storage 1082 includes a large-capacity storage device such as a hard disk or a solid state drive (SSD), and stores the content data.

Figure 5:
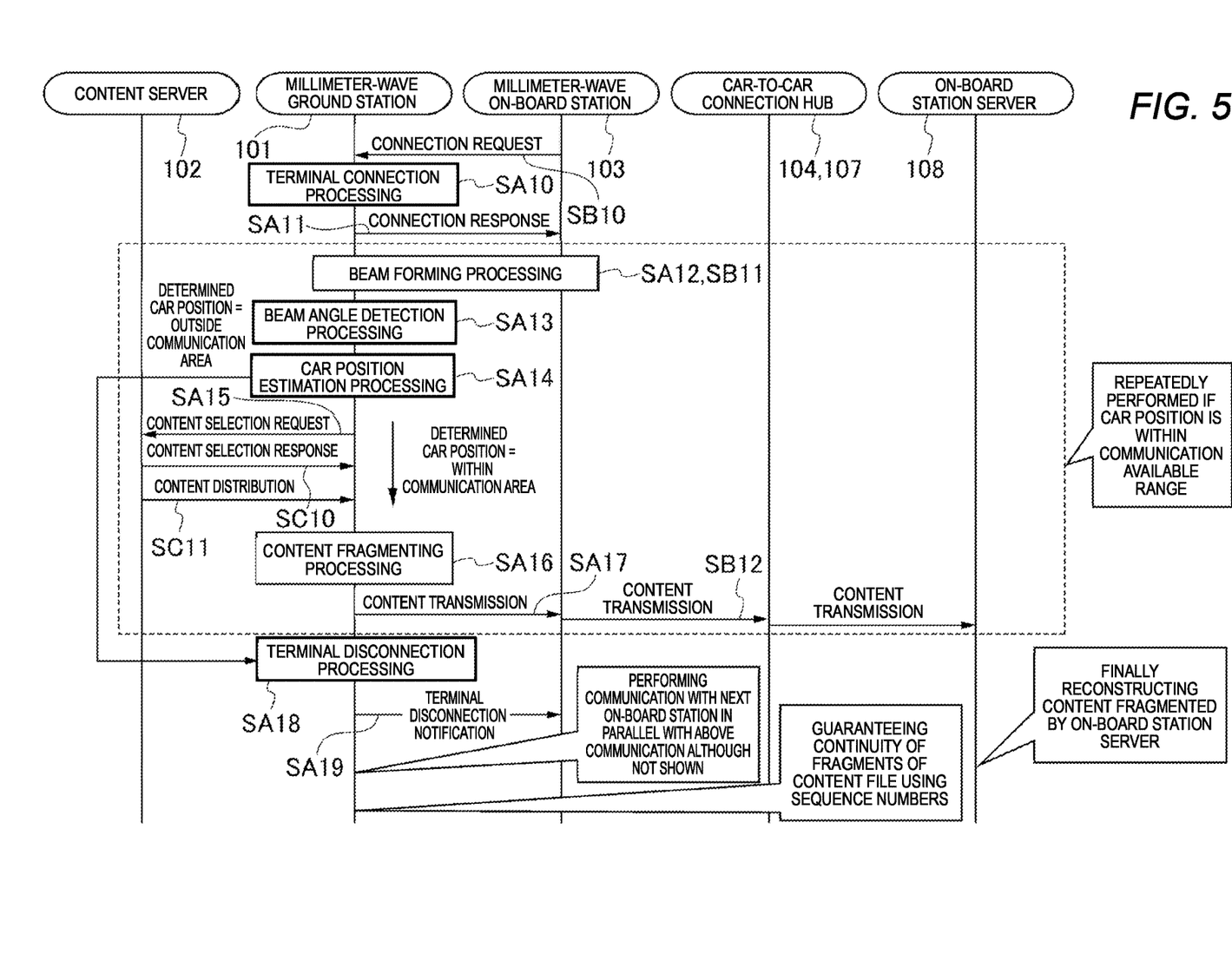
FIG. 5 is a flow diagram illustrating operations of the content data transmitting system shown in FIG. 1.

Next, operations of the content data transmitting system 100 according to the present embodiment will be described. FIG. 5 is a flow diagram for illustrating operations of the content data transmitting system 100 according to the present embodiment. Here, operations of the millimeter-wave ground station 101 include an operation of the beam angle detection unit 1014, an operation of the car position estimation unit 1015, an operation of the content management unit 1017, an operation of the terminal connection management unit 1018, and an operation of the CPU 1019, and each of the operations is described as an operation of the millimeter-wave ground station 101. Although an operation subject in the millimeter-wave on-board station 103 (106) is the CPU 1035, an operation of the CPU 1035 will be described as an operation of the millimeter-wave on-board station 103 (106). In addition, although an operation subject in the on-board station server 108 is the content management unit 1081, an operation of the content management unit 1081 will be described as an operation of the on-board station server 108.

In FIG. 5, the millimeter-wave on-board station 103 mounted on the lead car 300 transmits a connection request to the millimeter-wave ground station 101 when entering the station platform 200 (SB10). The millimeter-wave ground station 101 receives the connection request from the millimeter-wave on-board station 103 to perform terminal connection processing (SA10). When the terminal connection processing is completed, the millimeter-wave ground station 101 makes a connection response with respect to the millimeter-wave on-board station 103 (SA11).

After making the connection response with respect to the millimeter-wave on-board station 103, the millimeter-wave ground station 101 performs beam forming processing with the millimeter-wave on-board station 103 (SA12, SB11). The millimeter-wave ground station 101 performs beam angle detection processing based on a result of performing the beam forming processing with the millimeter-wave on-board station 103 (SA13). When a beam angle is detected, the millimeter-wave ground station 101 temporarily stores the detected beam angle in the RAM of the internal memory 1013. After the beam angle detection processing, the millimeter-wave ground station 101 performs car position estimation processing to estimate a position of the lead car 300. That is, the millimeter-wave ground station 101 calculates the position of the lead car 300 with the trigonometric function, based on the installation position information stored in the installation position information storage unit 1016 and the beam angle temporarily stored in the RAM of the internal memory 1013.

Next, the millimeter-wave ground station 101 determines whether the estimated car position is in a communication area, and makes a content selection request with respect to the content server 102 when determining that the estimated car position is in the communication area (SA15). The communication area is a range in which the millimeter-wave ground station 101 can stably communicate with the millimeter-wave on-board station 103. The range of the communication area may be determined by checking a range in which communication can be performed at a predetermined speed or higher, or may be determined based on specifications of the millimeter-wave ground station 101. A range in which the beam forming processing can be performed is usually wider than the communication area. This is because a communication traffic volume required for beam forming is little, and if the millimeter-wave ground station 101 and the millimeter-wave on-board station 103 can communicate with each other, the beam forming processing can be performed even when a communication speed thereof is low. When receiving the content selection request from the millimeter-wave ground station 101, the content server 102 makes a content selection response (SC10) and then distributes a content to the millimeter-wave ground station 101 (SC11). The millimeter-wave ground station 101 performs fragmenting processing on content data distributed from the content server 102 (SA16). That is, the content data distributed from the content server 102 is fragmented into distributable units. The millimeter-wave ground station 101 transmits the fragmented content data to the millimeter-wave on-board station 103 through wireless communication using millimeter waves (SA17).

After the content data is transmitted to the millimeter-wave on-board station 103, the millimeter-wave ground station 101 performs terminal disconnection processing (SA18), and performs terminal disconnection notification with respect to the millimeter-wave on-board station 103 (SA19). On the other hand, when it is determined that the estimated car position is out of the communication area, the millimeter-wave ground station 101 performs the terminal disconnection processing without acquiring the content data (SA18).

When receiving the content data transmitted from the millimeter-wave ground station 101, the millimeter-wave on-board station 103 transmits the content data to the on-board station server 108 mounted on the second car 301 via the LAN (SB12). A LAN line of the lead car 300 and a LAN line of the second car 301 are connected by the car-to-car connection HUBs 104 and 107, and the content data is transferred to the on-board station server 108 via the car-to-car connection HUBs 104 and 107.

The processing of SA12 to SA17 of the millimeter-wave ground station 101, the processing of SB11 and SB12 of the millimeter-wave on-board station 103 of the lead car 300, and the processing of SC10 and SC11 of the content server 102 are repeatedly performed as long as the car position of the lead car 300 is within a range in which communication is possible.

The millimeter-wave ground station 101 performs communication with the millimeter-wave on-board station 106 of the second car 301 in parallel with the communication with the millimeter-wave on-board station 103 of the lead car 300, and the continuity of the fragments of the content data is guaranteed using sequence numbers. Therefore, data subsequent to the content data transmitted to the millimeter-wave on-board station 103 is transmitted to the millimeter-wave on-board station 106 of the second car 301.

The fragmented content data transmitted from the millimeter-wave ground station 101 to the millimeter-wave on-board station 103 of the lead car 300 and the millimeter-wave on-board station 106 of the second car 301 is stored in the on-board station server 108, and is then reconstructed.

As described above, according to the content data transmitting system 100 according to the present embodiment, even when the lead car 300 and the second car 301 are moving, the positions of the cars 300 and 301 can be specified by the beam forming processing, the beam angle detection processing, and the car position estimation processing, and thus the content data can be transmitted in a spot manner. Accordingly, even if there is a railroad car stopped at a station platform adjacent thereto, it is possible to perform stable communication without radio frequency interference. Further, since the content data can be transmitted even when the cars 300 and 301 are moving, the period during which the content data can be transmitted can be made longer as compared with that in the related art, information can be transmitted in real time, and the amount of data that can be transmitted can be increased.

Since the content data to be transmitted to the lead car 300 and the second car 301 is fragmented pursuant to an allowable transmission unit, one piece of content data can be transmitted to the lead car 300 and the second car 301. Since the continuity of the fragments of the content data is guaranteed using the sequence numbers, the remaining data can be transmitted to the second car 301 when transmission of the part of data that can be transmitted to the lead car 300 is completed.

Since wireless communication using millimeter waves, such as wireless communication complying with the WiGig (registered trademark) standard, is used to transmit the content data, it is possible to transmit a large amount of content data at high speed. Since the WiGig (registered trademark) standard uses millimeter waves at the 60 GHz band, for example, radio frequency interference from the surroundings can be suppressed to a low level.

Although the moving object is a railroad car in the present embodiment, the moving object may be an automobile, a person, or the like.

Although one embodiment of the present invention has been described in detail above, it will be apparent to those skilled in the art that various changes and modifications can be made without departing from the spirit and scope of the present invention.

In the above-described embodiment, the distance L from the millimeter-wave ground station 101 to the car 300 or the like is calculated based on the height H of the millimeter-wave ground station 101 and the beam angle θ. If a three-dimensional position of the millimeter-wave ground station 101 is known, not only the distance L but also an accurate position of the car 300 or the like may be calculated.

Although the content data is divided into fragments in the above-described embodiment, if the content data is in a size allowing the transmission to complete within a time period from when the lead car 300 enters the communication area of the millimeter-wave ground station 101 to when the lead car 300 gets out of the communication area, the content data may not be divided into fragments. For the millimeter-wave ground station 101, the size of the content data and a size of the communication area are known, and the speed of the lead car 300 can be estimated by tracking change in the distance L. Based on these types of information, the millimeter-wave ground station 101 can determine whether transmission of the content data can be completed within the time period from when the lead car 300 enters the communication area of the millimeter-wave ground station 101 to when the lead car 300 gets out of the communication area.

Although the millimeter-wave ground station 101 estimates the position of all the cars in the above-described embodiment, the position of only a part of the cars may be estimated. In this case, even if all the cars are equipped with a millimeter-wave on-board station, the millimeter-wave ground station may estimate the position only for a limited car, such as one for every few cars, and transmit the content data to the millimeter-wave on-board station of the car. It may be switched between tracking the position of all the cars and tracking only the position of a part of the cars, depending on the number of the millimeter-wave on-board stations with which the millimeter-wave ground station is currently communicating, or depending on whether the communication is congested. In this way, it is possible to adjust load of the millimeter-wave ground station 101 when the number of cars managed by the millimeter-wave ground station 101 is large, for example, when a large number of trains constituted by a large number of cars are approaching.

Although the data transmitted by the millimeter-wave ground station 101 is content data such as an advertisement video in the above-described embodiment, other data may be transmitted.

Although the present invention has been described in detail with reference to a specific embodiment, it will be apparent to those skilled in the art that various changes and modifications can be made without departing from the spirit and scope of the present invention.

This application is based on Japanese Patent Application No. 2018-152667 filed on Aug. 14, 2018, the contents of which are incorporated herein by reference.

INDUSTRIAL APPLICABILITY

The data transmitting device and the data transmitting method according to the present invention are applicable to a content data transmitting device or the like that transmits content data such as an advertisement video to a moving object such as a railroad car.

REFERENCE SIGNS LIST

100: content data transmitting system
101: millimeter-wave ground station
102: content server
103, 106: millimeter-wave on-board station
104, 107: car-to-car connection HUB
108: on-board station server
200: station platform
300, 301: railroad car
1011, 1031: antenna
1012, 1032: millimeter-wave RF unit
1013, 1033: internal memory

The invention claimed is:

1. A data transmitting device comprising:
a transmitter configured to modulate and demodulate millimeter-wave radio-frequencies;
a processor; and
a memory comprising instructions that, when executed by the processor, cause the processor to perform operations comprising:
performing, by the transmitter operating in conjunction with the processor and the memory, beam forming processing with a millimeter-wave terminal located in at least one moving object;
detecting a beam angle from the beam forming processing based on a millimeter-wave terminal location and a location of the data transmitting device that is installed at a predetermined distance external from the at least one moving object;
estimating a position of the at least one moving object based on the beam angle and the location of the data transmitting device;
determining whether the estimated position of the at least one moving object is within a communication area of the data transmitting device for communication with suppressing radio frequency interference with another moving object; and
transmitting desired data to the at least one moving object through the transmitter if it is determined to be within the communication area,
wherein the beam forming processing is performed to provide a timeframe for the communication when the at least one moving object is moving.

2. The data transmitting device according to claim 1, further comprising:
a storage that stores the location of the data transmitting device.

3. The data transmitting device according to claim 1, wherein the operations further comprise:
fragmenting the desired data pursuant to an allowable transmission unit and transmits the fragmented data.

4. The data transmitting device according to claim 3, wherein the at least one moving object comprises a plurality of moving objects forming a prescribed group, wherein the operations further comprise:
with respect to one of the plurality of moving objects forming the group, determining whether it is possible to complete transmission of the data while the one of the plurality of moving objects is staying in the communication area based on the estimated position of the at least one moving object and a size of the data;
fragmenting the data if it is determined that it is not possible to complete the transmission of the data while the one of the plurality of moving objects is staying in the communication area; and
transmitting different fragments of the data to the one of the plurality of moving objects and other moving objects forming the group through the transmitter, respectively, while the respective moving objects are staying in the communication area.

5. The data transmitting device according to claim 4, wherein the operations further comprise:
transmitting the data to the one of the plurality of moving objects without fragmenting the data if it is determined that it is possible to complete the transmission of the data while the one of the plurality of moving objects is staying in the communication area.

6. The data transmitting device according to claim 4, wherein the at least one moving object is a railroad car, and the group is a set of the railroad cars connected to each other.

7. A data transmitting method comprising:
performing beam forming processing with a millimeter-wave terminal located in at least one moving object;
detecting a beam angle from the beam forming processing based on a millimeter-wave terminal location and a location of a data transmitting device that is installed at a predetermined distance external from the at least one moving object;

estimating a position of the at least one moving object based on the beam angle and the location of the data transmitting device that executes the data transmitting method;

determining whether the estimated position of the at least one moving object is within a communication area of the data transmitting device that executes the data transmitting method for communication with suppressing radio frequency interference with another moving object; and transmitting desired data to the at least one moving object if it is determined to be within the communication area, wherein the beam forming processing is performed to provide a timeframe for the communication when the at least one moving object is moving.

* * * * *